United States Patent [19]
Niitsuma et al.

[11] Patent Number: 5,773,137
[45] Date of Patent: Jun. 30, 1998

[54] MAGNETIC RECORDING DISK

[75] Inventors: Kazuhiro Niitsuma; Yasushi Endo, both of Odawara, Japan

[73] Assignee: Fuji Photo Film Co., Ltd., Japan

[21] Appl. No.: 667,499

[22] Filed: Jun. 21, 1996

[30] Foreign Application Priority Data

Jun. 21, 1995 [JP] Japan ................................. 7-179514

[51] Int. Cl.$^6$ ..................................................... B32B 5/16
[52] U.S. Cl. .................. 428/323; 428/141; 428/694 BS; 428/694 BU; 428/694 BY
[58] Field of Search ...................... 428/694 BS, 694 BU, 428/694 BY, 323, 141

[56] References Cited

U.S. PATENT DOCUMENTS

| | | | |
|---|---|---|---|
| 4,880,666 | 11/1989 | Ito et al. ........................... | 428/694 BU |
| 5,080,967 | 1/1992 | Noguchi et al. .................. | 428/694 BU |
| 5,258,223 | 11/1993 | Inaba et al. ....................... | 428/694 BS |

*Primary Examiner*—Melvyn I. Marquis
*Attorney, Agent, or Firm*—Brinks Hofer Gilson & Lione

[57] ABSTRACT

A magnetic recording disk having a flexible non-magnetic support, an intervening non-magnetic layer of 0.5 to 5 μm thick which contains as binder and anon-magnetic inorganic powder, and a magnetic layer of 0.02 to 0.5 μm thick containing a binder, a ferromagnetic powder, carbon black and a lubricant to reduced in its tendency to make a magnetic head of a magnetic recording/reproducing device corrosive without reducing its running endurance, by employing a binder polymer containing no chlorine atom in its molecular structure for both the non-magnetic layer and the magnetic layer and by making the magnetic layer to have an upper surface having a Knoop hardness of 14 to 25.

16 Claims, 2 Drawing Sheets

MAGNETIC RECORDING DISK

FIELD OF THE INVENTION

The present invention relates to a magnetic recording disk which comprises a flexible non-magnetic support, a thick non-magnetic layer having a non-magnetic powder dispersed therein, and a thin magnetic layer having a ferromagnetic powder dispersed therein which is superposed on the non-magnetic layer. Particularly, the invention relates to a magnetic recording disk which is favorably employable for high density recording and has very high running durability.

BACKGROUND OF THE INVENTION

Magnetic recording disks such as floppy disks have been widely employed as external storage devices, with the spread of various office automatic apparatuses such as word processors and personal computers. The floppy disk is composed of a flexible non-magnetic support (such as a support of plastic material) and a magnetic layer comprising a magnetic powder such as a ferrite powder or a metal alloy powder. The magnetic layer is generally produced by a coating method or a vapor deposition. A magnetic layer of the vapor deposition type can be formed on a support by vacuum deposition without employment of a binder. Therefore, the magnetic layer of the vapor deposition type is advantageous in that it can be produced to give a thin magnetic layer and the thin magnetic layer enables increased high recording density, as compared with the magnetic recording disk produced by a coating method. However, it also has a disadvantage in that its production cost is high.

The magnetic recording disk of the coating type can be produced by coating a magnetic paint for forming a magnetic layer with comprises a magnetic powder, a binder and an organic solvent continuously on a support and drying the coated magnetic paint layer. Therefore, the magnetic recording disk of the coating type is advantageous in that its production cost is low, as compared with the magnetic recording disk of the vapor deposition type. The coated magnetic layer, however, ought to contain auxiliary materials such as an electroconductive powder, a lubricant and an abrasive so as to impart high performance to the magnetic layer, for instance, to increase its abrasion resistance to a practically satisfactory level and reduce its surface electric resistance. The incorporation of the auxiliary materials into the magnetic layer results in decrease of the amount of the magnetic powder, increase of the thickness of the magnetic layer (such as a thickness of 3 to 6 $\mu$m), and the thickness loss such as reduction of output. It is known that the thickness loss can be effectively reduced by decreasing the thickness of the magnetic layer. It is also known that the reduced thickness of the magnetic layer further results in increase of recording density. However, if the thickness of the magnetic layer is reduced, it is difficult to incorporate an enough amount of the auxiliary materials such as an electroconductive powder into the magnetic layer. In that case, the surface electric resistance of the magnetic layer is apt to be higher and the endurance decreases. Particularly, if the thickness of the magnetic layer decreases to 2 $\mu$m or less, the surface of the magnetic layer is easily influenced by the roughness of the surface of the support whereby the running property deteriorates and the electromagnetic conversion property lowers.

Japanese patent Provisional Publications No. 62-154225 and No. 62-222427 describe a magnetic recording disk having a thinner magnetic layer (0.3 to 1 $\mu$m) and a thick subbing layer (non-magnetic layer) which is thicker tan the magnetic layer and is provided between the support and the thin magnetic layer, whereby solving the above-mentioned problems. The thick subbing layer can be incorporated with a portion of a non-magnetic powder (abrasive) such as titanium dioxide and a portion of an electroconductive powder (carbon black) which have been conventionally incorporated into the magnetic layer. Therefore, the magnetic layer can be made thinner (hence, made suitable for high density recording), the surface electric resistance is kept low, and the influence of the surface roughness of the support is reduced. Therefore, thus produced magnetic recording disk shows excellent endurance and running property. However, other troubles are caused in the production of the magnetic recording disk having such structure. When the thick subbing layer (non-magnetic layer) is formed on the support by coating an appropriate solution and drying the coated layer and then the thin magnetic layer is formed by coating a magnetic paint on the dried subbing layer, the properties of the produced thin magnetic layer is apt to deteriorate. In more detail, when the magnetic paint for the preparation of the magnetic layer is coated on the dry subbing layer, the subbing layer is apt to swell by absorbing the organic solvent of the magnetic paint and the swelling of the subbing layer causes turbulent flow of the magnetic paint under coating. Such phenomena cause lowering of the surface smoothness of the resulting magnetic layer and decrease of the electromagnetic conversion property.

Japanese Patent Provision Publications No. 62-191315, No. H4-325917, No. H5-109061 and No. H6-68453 describe a process for preparing the magnetic recording disk which comprises the steps of: coating on a support a coating dispersion for the non-magnetic layer which contains a non-magnetic powder dispersed in a binder resin solution to form a non-magnetic layer; coating a magnetic paint (i.e., coating dispersion for the magnetic layer which contains a magnetic powder dispersed in a binder resin solution) on the non-magnetic layer while the non-magnetic layer is still wet; and then drying these layers simultaneously. This process enables formation of an extremely thin magnetic layer with little influence to the conditions of the non-magnetic layer. Therefore, the resulting magnetic layer has satisfactory surface smoothness and shows improvement of the electromagnetic conversion property. The above Patent Provisional Publications further described the incorporation of a lubricant and carbon black (i.e., electroconductive particles) in combination into both layers, i.e., the non-magnetic layer and the magnetic layer of the magnetic recording disk, so as to further improve the electromagnetic conversion properties, anti-static property, and running endurance. Further, description is given for the non-magnetic powder employed for the preparation of the non-magnetic layer of 0.5 to 5 $\mu$m thick. According to the description, a non-magnetic power (e.g., titanium dioxide or $\alpha$-alumina) has a particle size of approximately 0.3 $\mu$m. The binder resins are selected from various known polymer resins such as thermoplastic resins, thermosetting resins, and reactive resins. Generally employed binder resins are vinyl chloride resin, vinyl chloride/vinyl acetate copolymer resin, vinyl chloride/vinyl acetate/vinyl alcohol copolymer resin, vinyl chloride/vinyl acetate/maleic anhydride copolymer resin, and other polymers containing a chlorine atom in its molecular structure, which are chosen for imparting a sufficient hardness to the magnetic layer.

The magnetic recording disk is now widely employed in various fields and sometimes is used under unfavorable conditions such as conditions with widely varying temperature and humidity and conditions with a large amount of dusts. Particularly, if the magnetic recording disk is employed under conditions with much dusts, the dusts are easily adsorbed by the disk due to electrostaticity produced in the course of disk running. The adsorbed dusts cause increase of drop-outs and sometimes bring about severe troubles. Therefore, the magnetic recording disk is now required to show high reliability and stability even under such severe conditions. Further, requirements for increase of the recording capacity and reduction of the disk size are getting stronger. Therefore, the magnetic recording disk now should ensure, or further improve, high performances on the reproduction output, overwriting property, and running endurance, notwithstanding the requirements for the high recording capacity by the employment of the thinner magnetic layer. Particularly, the thinner magnetic layer such as of thinner than 0.5 µm likely becomes to lower in its running durability, because the magnetic layer of the recording disk is rotated at a high speed in contact with a magnetic head of the magnetic recording/reproducing device and members of the disk cartridge. Such rotation of a high speed is required for enabling the desired high recording density.

The high speed rotation, however, brings about new troubles such as increased liner wear. As is known, a floppy disk is encased in a cartridge having liners in its respective inner surfaces. The liner is thin cloth made of fibers and has a function to clean the surface of the encased floppy disk which is rotated in operation within the cartridge. When the floppy disk is rotated at an extremely high speed, a portion of the fibers of the liner is apt to drop out from the liner and to move onto the surface of the rotating floppy disk. The fibers placed on the floppy disk sometimes cause the so called "drop-out" of output signals. Otherwise, the high speed rotation of the floppy disk may cause falling-off of a portion of the magnetic layer in contact with the liner surface so as to give a damage to the floppy disk. The fallen-off portion of the magnetic layer is sometimes attached onto other area of the magnetic layer to cause the drop-out.

It has been found that the floppy disk under a rotation of increased speed is apt to cause corrosion of a magnetic head of a magnetic recording/reproducing device. Particularly, a thin layer head such as the so called MR magnetic head which is designed for enabling high density recording is easily damaged by corrosion. A further study has revealed that the corrosion of the magnetic head is probably caused by the chlorine atom relieved from the chlorine atom-containing binder polymer such as a vinyl chloride copolymer.

SUMMARY OF THE INVENTION

The present invention has an object to improve various properties such as anti-static property, electromagnetic conversion properties (e.g., overwriting property and reproduction output), and running endurance of a magnetic recording disk having a thin magnetic layer for high density recording, and further to reduce its tendency to cause corrosion of a magnetic head used in contact with the disk.

The present invention resides in a magnetic recording disk comprising a flexible non-magnetic support, a non-magnetic layer of 0.5 to 5 µm thick which is arranged on the support and comprises a non-magnetic inorganic powder in a binder, and a magnetic layer of 0.02 to 0.5 µm thick which is arranged on the non-magnetic layer and comprises a ferromagnetic powder, carbon black and a lubricant dispersed in a binder, wherein the binders of the non-magnetic layer and the magnetic layer both comprise a polymer containing no chlorine atom in its molecular structure and the magnetic layer has an upper surface having a Knoop hardness of 14 to 25.

The present invention further resides in a magnetic recording and reproducing method which employs the above-described magnetic recording disk of the invention and comprises recording a set of digital signals having a minimum recording wavelength of not longer than 1.5 µm on the magnetic layer of the magnetic recording disk under such condition that a magnetic head is kept in contact with the magnetic layer, and reproducing the recorded digital signals from the magnetic layer under such condition that a magnetic head is kept in contact with the magnetic layer.

DETAILED DESCRIPTION OF THE INVENTION

Figure 1:
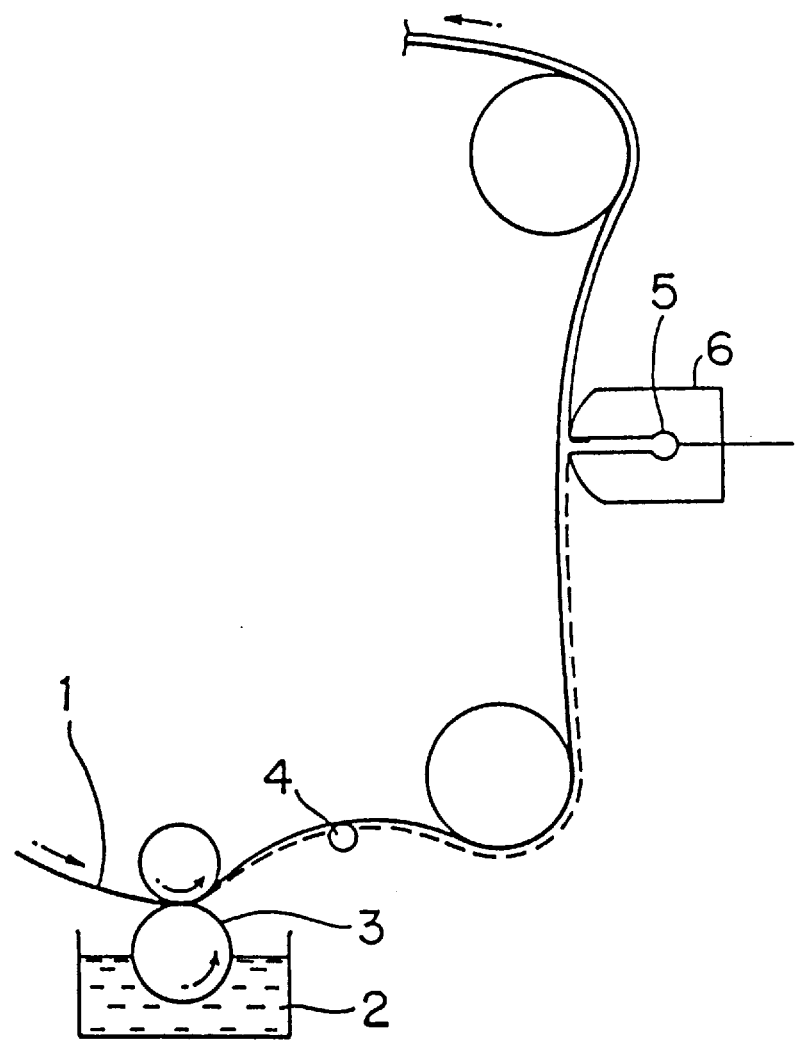
FIG. 1 schematically shows a successive double coating method in which one layer is formed and another layer is formed on that layer while it is under wet condition.

The magnetic recording disk of the invention is further described below.

Preferred embodiments of the invention are as follows.

1) the non-magnetic inorganic powder in the non-magnetic layer comprises at least two kinds of non-magnetic inorganic powders having different mean particle sizes, one of which has a mean particle size in the range of 10 to 80% of the thickness of the non-magnetic layer and another of which has a mean particle size in the range of 0.5 to 10% of the thickness of the non-magnetic layer, the former powder and the latter powder being in a weight ratio of 3:97 to 40:60.

2) The mean particle size of one non-magnetic inorganic powder in the non-magnetic layer differs from the mean particle size of another non-magnetic inorganic powder by at least 5% of the thickness of the non-magnetic layer.

3) The non-magnetic inorganic powders both have a Mohs hardness of not less than 5.

4) The non-magnetic inorganic powder having a mean particle size in the range of 10 to 80% of the thickness of the non-magnetic layer has a Mohs hardness higher than a Mohs hardness of the non-magnetic inorganic powder having a mean particle size in the range of 0.5 to 10% of the thickness of the non-magnetic layer.

5) The non-magnetic inorganic powder having a mean particle size in the range of 10 to 80% of the thickness of the non-magnetic layer has a Mohs hardness higher than a Mohs hardness of the non-magnetic inorganic powder having a mean particle size in the range of 0.5 to 10% of the thickness of the non-magnetic layer, by not less than 2.

6) The non-magnetic inorganic powder having a mean particle size in the range of 10 to 80% of the thickness of the non-magnetic layer is a powder of α-alumina.

7) The non-magnetic inorganic powder having a mean particle size in the range of 0.5 to 10% of the thickness of the non-magnetic layer is a powder of titanium dioxide.

8) The polymer containing no chlorine atom in its molecular atom is a polyurethane resin.

9) The polymer containing no chlorine atom in its molecular atom is a polyurethane resin having a polar group in its molecular structure in an amount of $10^{-1}$ to $10^{-8}$ mole/g.

10) The polymer containing no chlorine atom in its molecular atom is cured by a trimer of isocyanate or a polymethylenepolyphenylene polyisocyanate.

11) The carbon black in the magnetic layer has a mean particle size in the range of 10 to 35 mμ.

12) The non-magnetic layer further comprises carbon black in an amount of 3 to 20 weight parts based on 100 weight parts of the whole non-magnetic inorganic powders in the non-magnetic layer.

13) The non-magnetic layer has a thickness in the range of 1.0 to 3.5 μm, and the magnetic layer has a thickness in the range of 0.03 to 0.45 μm.

14) The magnetic layer has been formed on the non-magnetic layer when the non-magnetic layer has had a wet surface.

The magnetic layer of the magnetic recording disk according to the invention is preferably formed on the non-magnetic layer while the non-magnetic layer is under wet condition. In more detail, the magnetic layer of the magnetic recording disk of the invention is formed on the non-magnetic layer simultaneously or just after the coating of the non-magnetic layer (coasted layer) and while the non-magnetic layer is still wet. This process is named a "wet-on-wet" process.

The coating according to the wet-on-wet process can be done, for instance, one of the following manners:

1) The non-magnetic layer is first formed by means of an apparatus for gravure coating, roll coating, blade coating, or extrusion coating, and the magnetic layer is then formed on the coated non-magnetic layer by means of a supported pressure extrusion apparatus while the coated non-magnetic layer is still wet. See Japanese Patent Provisional Publications No. H6-238179 and No. H2-265572, and Japanese Patent Publication No. H1-46186.

2) The non-magnetic layer and the magnetic layer are formed almost simultaneously by means of a coating apparatus equipped with a single head having two extrusion slits. See Japanese Patent Provisional Publications No. 63-88080, No. H2-17921, and No,. H2-265672.

3) The non-magnetic layer and the magnetic layer are formed almost simultaneously by means of an extrusion coating apparatus equipped with a back-up roller. See Japanese Patent Provisional Publication No. H2-174965.

When any of the above-mentioned coating processes are employed, the coating solutions (dispersions) are preferably given a shear force inside of the coating head so as to obviate agglomeration of the ferromagnetic powder in the solution and lowering of the electromagnetic conversion property of the resulting magnetic recording disk. See Japanese Patent Provisional Publications No. 62-95174 and No. H1-236968. Preferably, the coating solution has a viscosity in a specific range, as described in Japanese Patent Provisional Publication No. H-8471.

Figure 2:
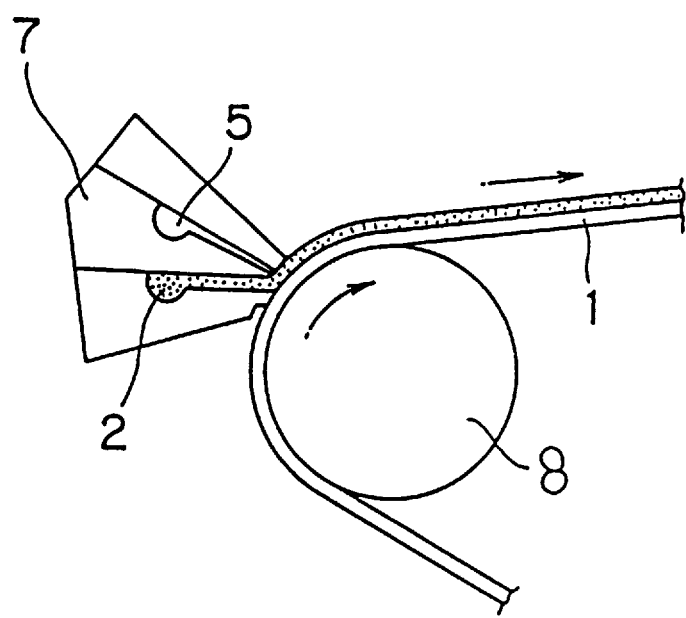
FIG. 2 schematically shows a simultaneous double coating method in which plural layers are simultaneously formed on a support using extrusion coating.

The wet-on-wet coating process is described in more detail by referred to FIGS. 1 and 2 on the attached drawings.

FIG. 1 is a schematic view of the successive coating method which includes forming one coated layer (e.g. non-magnetic layer) and subsequently forming another layer (e.g., magnetic layer) on the coated layer while the latter layer is still wet. As is shown in FIG. 1, a continuously running flexible support 1 such as of polyethylene terephthalate is pre-coated with a coating liquid 2 (e.g., coating liquid for forming the non-magnetic layer) using a coating device 3, to form a subbing layer (non-magnetic layer). Just after the pre-coating, the surface of the coated layer is smoothed using a smoothing roller 4, and subsequently a coating liquid 5 (e.g., coating liquid for forming the magnetic layer) is coated on the pre-coated layer using a coating device (extrusion coating device) 6, while the pre-coated layer still is under the wet condition, whereby forming the over-coating layer (magnetic layer).

FIG. 2 is a schematic view of the simultaneous coating method which includes forming plural layers at one time according to extrusion coating. As is shown in FIG. 2, a continuously running flexible support 1 such as of polyethylene terephthalate is coated with a coating liquid 2 (e.g., coating liquid for forming the non-magnetic layer) and a coating liquid 5 (e.g., coating liquid for forming the magnetic layer) simultaneously by means of a simultaneous plural coating apparatus 7 and a back-up roller 8 to form the non-magnetic layer and the magnetic layer at the same time. The magnetic recording disk of the present invention is preferably produced utilizing the simultaneous plural coating method, from the viewpoint of efficiency in its industrial production.

The combination of the non-magnetic layer and the magnetic layer can be formed on one side or both sides of the non-magnetic support.

The non-magnetic support employable for the preparation of the magnetic recording disk is now described.

There are no specific limitations with respect to the support material, so long as it is flexible. Most of materials having been employed for the supports of the conventional magnetic recording disks. Examples of the support materials include films of various polymers such as polyethylene terephthalate, polyethylene, polypropylene, polycarbonate, polyethylene naphthalate, polyamide, polyamideimide, polyimide, polysulfone, and polyethersulfone; and metallic foils such as aluminum foil and stainless steel foil. Preferred is a film of polyethylene terephthalate.

The non-magnetic support generally has a thickness in the range of 1 to 100 μm, preferably 4 to 85 μm.

The non-magnetic support to be employed in the invention may be subjected, in advance, to corona discharging, plasma discharging, adhesion-improving processing, thermal treatment or dust-removing treatment.

The non-magnetic support preferably has a center line average surface roughness (Ra: cut-of at 0.25 mm) of 0.03 μm or less, more preferably 0.02 μm or less, most preferably 0.01 μm or less. It is also preferred that the non-magnetic support has no large protrusions such as 1 μm or larger. The surface roughness and other surface conditions of the non-magnetic support can be controlled, if necessary, by varying the size and amount of the filler incorporated into the support. Examples of the fillers include oxides and carbonates of Ca, Si and Ti, and organic fine powders such as powdery acrylic resin.

The non-magnetic layer formed on the non-magnetic flexible support comprises a non-magnetic powder in a binder of a polymer containing no chlorine atom in its molecular structure. The non-magnetic layer has a thickness in the range of 0.5 to 5 μm, preferably 1.0 to 3.5 μm, more preferably 1.0 to 2.0 μm. If the thickness of the non-magnetic layer is less than 0.5 μm, it becomes difficult to incorporate into the non-magnetic layer a lubricant in an amount enough for ensuring high running endurance for a long time. If the thickness of the non-magnetic layer is too large, it becomes difficult to ensure satisfactory surface property of the magnetic layer to be arranged thereon.

The binder employable for the formation of the non-magnetic layer (also for the formation of the magnetic layer)

comprises a polymer containing no chlorine atom in its molecular structure.

The binders employable in the invention may be a thermoplastic resin, a thermosetting resin, a reactive-type resin, and their mixtures.

The above-mentioned thermoplastic resin preferably has a glass transition temperature in the range of −100° to 150° C., a number average molecular weight in the range of 1,000 to 200,000, preferably 10,000 to 100,000, and a polymerization degree in the range of approximately 50 to 1,000.

Examples of such thermoplastic resins include homopolymers and copolymers having as their constitutional units, vinyl acetate, vinyl alcohol, maleic acid, acrylic acid, acrylic esters, acrylonitrile, methacrylic acid, methacrylic esters, styrene, butadiene, ethylene, vinyl butyral, vinyl acetal, and/or vinyl ethers; polyurethane resins, and other elastic resins containing no chlorine atom in their molecular structures.

Examples of the thermosetting resins and the reactive-type resins include phenol resin, epoxy resin, curable polyurethane resin, urea resin, melamine resin, alkyd resin, acrylic reactive resin, formaldehyde resin, silicone resin, epoxy-polyamide resin, mixture of polyester resin and isocyanate prepolymer, mixture of polyester polyol and polyisocyanate, and mixtures of polyurethane and polyisocyanate.

These reins are described in detail in "Plastic Handbook" of new version, written in Japanese, published in 1985 by Asakura Shoten).

Also employable is an electron beam-curable resin. Examples of such resin and their preparations are described in detail in Japanese Patent Provisional Publication No. 62-256219.

The above-mentioned resins can be employed singly or in combination.

In the invention, the binder polymer preferably comprises polyurethane and polyisocyanate.

The polyurethane resin can be polyester polyurethane, polyether polyurethane, polyether polyester polyurethane, polycarbonate polyurethane, polyester polycarbonate polyurethane and polycaprolactone polyurethane.

The above-mentioned binder polymers preferably contain at least one polar group selected from the group consisting of —COOM, —SO$_3$M, —SO$_3$M, —P=O(OM)$_2$, —O—P=O(OM)$_2$ (M is hydrogen atom or an alkali metal), —OH, —NR$_2$, —N$^+$R$_3$ (R is a hydrocarbon group), epoxy group, —SH, and —CN. These polar groups can be incorporated into the binder polymer by copolymerization or addition reaction.

The polar group is preferably incorporated into the binder polymer in an amount of $10^{-1}$ to $10^{-8}$ mole/g, more preferably $10^{-2}$ to $10^{-6}$ mole/g.

The polyurethane preferably has a glass transition temperature in the range of −50° to 100° C., an elongation at rupture in the range of 100 to 2,000%, a breaking stress in the range of 0.05 to 10 kg/cm$^2$, a breakdown point in the range of 0.05 to 10 kg/cm$^2$.

The polyurethane or other binder polymer is preferably employed in combination with a curing agent such as a polyisocyanate.

Preferred examples of polyisocyanates include a trimer of isocyanate having the following formula (I) and polymethylenepolyphenylene polyisocyanate having the following formula (II):

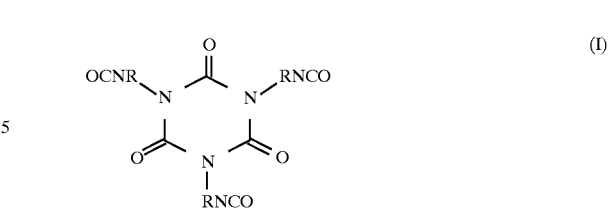

in which R is one of the following divalent groups:

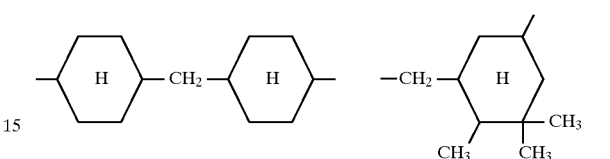

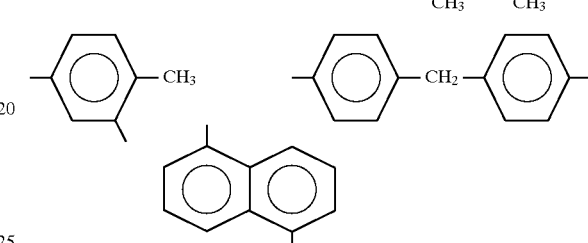

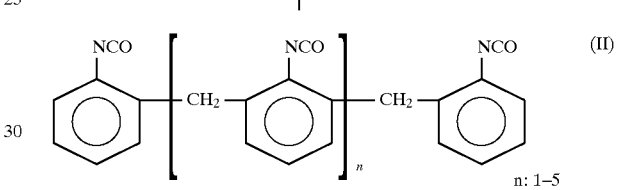

Also employable are tolylene diisocyanate, 4,4-diphenylmethane diisocyanate, hexamethylene diisocyanate, xylylne diisocyanate, naphthylene-1,5-diisocyanate, o-toluidine diisocyanate, isophorone diisocyanate, and triphenylmethane triisocyanate; reaction products of these isocyanates and polyalcohols; and polyisocyanates produced by condensations of isocyanates, which are preferably employed in combination with the polyisocyanate of the formula (I) or (II).

The binder polymer can be employed in the range of 5 to 50 weight parts, preferably 10 to 30 weight parts, in the non-magnetic powder in the non-magnetic layer.

The non-magnetic layer of the magnetic recording disk of the invention preferably contains two or more kinds of non-magnetic inorganic powders, one of which has a mean particle size in the range of 10 to 80% of the thickness of the non-magnetic layer and another of which has a mean particle size in the range of 0.5 to 10% thereof. The large non-magnetic inorganic powder preferably has a mean particle size in the range of 15 to 75% of the thickness of the non-magnetic layer, and the small non-magnetic inorganic powder preferably has a mean particle size in the range of 1 to 7% thereof.

The difference of the mean particle size of the large non-magnetic inorganic powder and the mean particle size of the small non-magnetic inorganic powder preferably is not less than 5%, preferably not less than 10%, more preferably not less than 15%, most preferably in the range of 30 to 80%, of the thickness of the non-magnetic layer.

The two or more kinds of the non-magnetic inorganic powders preferably have relatively high hardness, such as a Mohs hardness of not less than 5, more preferably of not less than 6. If non-magnetic inorganic powders having different hardness are employed, the hardness of the large non-magnetic inorganic powder preferably is higher than that of the small non-magnetic inorganic powder. In this case, the difference of hardness preferably is 2 or more, more preferably 3 or more.

Moreover, the non-magnetic inorganic powder preferably has a tap density of 0.3 to 2 g/cc, a water content of 0.1 to 5%, pH of 2 to 11, and a specific surface area of 1 to 30 m$^2$/g. The non-magnetic inorganic powder can be in any shapes such as acicular, spherical and cubic.

Examples of the non-magnetic inorganic powders employable in the invention include α-alumina (which is converted into the α-phase of 90% or more), β-alumina, γ-alumina, silicon carbide, chromium oxide, cerium oxide, α-iron oxide, corundum, silicon nitride, titanium carbide, titanium dioxide, silicon dioxide (silica), boron nitride, zinc oxide, calcium carbonate, calcium sulfate, and barium sulfate. These powders can be employed singly or in combination. These powders are employed after selection to satisfy the above-described conditions of the mean particle sizes and the difference of hardness. In the present invention, titanium dioxide, α-alumina, α-iron oxide and chromium oxide are preferably employed. Particularly preferred are α-alumina for the large non-magnetic inorganic powder and titanium dioxide for the small non-magnetic inorganic powder.

Concrete examples of the non-magnetic inorganic powders employable in the invention include AKP-10, AKP-12, AKP-15, AKP-18, AKP-20, AKP-30, AKP-50, HIT-50, HIT-55, HIT-60, and HIT-100 (all are available from Sumitomo Chemical Industry Co., Ltd.), G5, G7 and S-1 (all available from Nippon Chemical Industry Co., Ltd.), TTO55 and ET300W (both available from Ishihara Sangyou Co., Ltd.), and STT 30 (available from Titan Industry Co., Ltd.).

The powder having a mean particle size of 10 to 80% of the thickness of the non-magnetic layer and the powder having a mean particle size of 0.5 to 10% thereof are preferably contained in the non-magnetic layer at a weight ratio of 3:97 to 40:60, preferably 5:95 to 35:65, specifically preferably 10:90 to 30:70.

The non-magnetic layer of the magnetic recording disk of the invention can further contain carbon black, a dispersant, a plasticizer, an electroconductive powder (anti-static agent) other than carbon black, and an anti-mildew agent, in addition to the aforementioned materials. Examples of the auxiliary materials are described in detail hereinbelow.

The addition of carbon black serves for imparting electroconductivity to the magnetic recording disk to obviate electrostatic deposition and for ensuring smooth surface of the magnetic layer, whereby decreasing spacing loss between the surface of the magnetic layer and the recording/reproducing head to give high output powder. The carbon black to be employed in the invention preferably has a relatively small size such as not more than 35 mμ, more preferably 10 to 35 mμ. The specific surface area of the carbon black preferably is in the range of 5 to 500 m$^2$/g, more preferably 700 to 1,400 m$^2$/g. The DBP oil absorbing capacity preferably is in the range of 10 to 1,500 mL/100 g, more preferably 300 to 1,000 mL/100 g. The carbon black preferably has a pH range of 2 to 10 and a water content of 0.1 to 10%. The tap density of the carbon black preferably is in the range of 0.1 to 1 g/cc. The above-mentioned DBP oil absorption capacity can be determined by adding dibutyl phthalate (DBP) to the carbon black for kneading and observing the kneaded powder with increase of the volume of addition of DBP to check the volume (in terms of mL) of DBP when the powder under dispersion turns into a coagulated mass.

Any of various kinds of carbon blacks produced by various processes can be utilized in the invention. Examples of the carbon blacks include furnace black, thermal black, acetylene black, channel black, and lamp black. Concrete examples of the carbon blacks employable in the invention include BLACKPEARL S 2000, 1300, 1000, 900, 800, 700, VULCAN XC-72 (all available from Cabbot Corporation), #35, #50, #55, #60 and #80 (all available from Asahi Carbon Co., Ltd.), #3950B, #3750B, #3250B, #2400B, #2300B, #1000, #900, #40, #30 and #10B (all available from Mitsubishi Chemical Industries Co., Ltd.), CONDUCTEX SC, RAVEN, 150, 50, 40, 15 (all available from Columbia Carbon Corporation), and Ketchen Black EC, Ketchen Black ECDJ-500 and Ketchen Black ECDJ-600 (all available from Lion-Akzo Co., Ltd.).

The carbon black can be coated with a dispersing agent, grafted with a resin, or graphited on a portion of the surface. The carbon black can be dispersed in a binder before it is added to a coating solution for the formation of the non-magnetic layer. The carbon black can be employed singly or in combination.

Other examples of carbon blacks employable in the invention are seen, for instance, in "Handbook of Carbon Black", in Japanese Language, edited by Society of Carbon Black, published by Tosho Shuppan, 1970).

The amount of carbon black to be incorporated into the non-magnetic layer generally is in the range of 3 to 20 weight parts, preferably 4 to 18 weight parts, more preferably 5 to 15 weight parts, based on 100 weight parts of the whole non-magnetic inorganic powder in the non-magnetic layer. If the amount of carbon black is less than 3 weight parts, the surface resistivity does not satisfactorily lower. If the amount of carbon black is more than 20 weight parts, it becomes not easy to ensure surface smoothness of the magnetic layer.

The lubricant serves reducing friction between the surface of the magnetic layer and the magnetic head and keeping smooth slide contact therebetween. Examples of the lubricants include silicone oils such as dialkyl polysiloxane (alkyl has carbon atoms of 1 to 5), dialkoxy polysiloxane (alkoxy has carbon atoms of 1 to 4), monoalkyl monoalkoxy polysiloxane (alkyl has carbon atoms of 1 to 5 and alkoxy has carbon atoms of 1 to 4), phenyl polysiloxane, and fluoroalkylpolysiloxane (alkyl has carbon atoms of 1 to 5); electroconductive fine powders such as graphite; inorganic powder such as molybdenum disulfide powder and tungsten disulfide powder; plastic fine powders such as powders of polyethylene, polypropylene, polyethylene-vinyl chloride copolymer, and polytetrafluroethylene; α-olefin polymer; unsaturated aliphatic hydrocarbon which is at a liquid state at room temperature (e.g., a compound having a double bond of n-olefin at the end, carbon atoms of approximately 20); fatty acid esters of a mono-basic fatty acid having 12 to 20 carbon atoms and a monohydric alcohol having 3 to 12 carbon atoms; and fluorocarbons. Most preferred are fatty acid esters.

Examples of alcohols employable for preparing suitable fatty acid esters include monohydric alcohols such as ethanol, butanol, phenol, benzyl alcohol, 2-methylbutyl alcohol, 2-hexyldecyl alcohol, propylene glycol monobutyl ether, ethylene glycol monobutyl ether, dipropylene glycol monobutyl ether, diethylene glycol monobutyl ether, and sec-butyl alcohol; and polyhydric alcohols such as ethylene glycol, diethylene glycol, neopentyl glycol, glycerol and sorbitol derivatives. These alcohols can be employed singly or in combination.

Examples of fatty acids include aliphatic carboxylic acids such as acetic acid, propionic acid, octanoic acid, 2-ehtylhexanoic acid, lauric acid, myristic acid, stearic acid, palmitic acid, behenic acid, arachic acid, oleic acid, linoleic acid, linolenic, elaidic and palmitoleic acid. These fatty acid can be employed singly or in combination.

Concrete examples of the above-mentioned fatty acid esters include butyl stearate, sec-butyl stearate, isopropyl stearate, butyl oleate, amyl stearate, 3-methylbutyl stearate, 2-ethylhexyl stearate, 2-hexyldecyl stearate, butyl palmitate, 2-ethylhexyl myristate, mixture of butyl stearate and butyl palmitate, oleyl oleate, butoxyethyl stearate, 2-butyoxy-1-propyl stearate, dipropylene glycol monobutyl ether acrylated with stearic acid, diethylene glycol dipalmitate, hexamethylenediol acylated with myristic acid, and oleates of various glycerols.

When a magnetic recording disk is employed at a high relative humidity, the fatty acid ester contained therein undergoes hydrolysis. Such hydrolysis of the fatty acid esters can be reduced by selecting the chemical structures of the esters from the viewpoint that the fatty acid and alcohol are of straight chain type of branched chain type or cis-type or trans-type.

The lubricant can be incorporated into the non-magnetic layer in an amount of 0.2 to 20 weight parts per 100 weight parts of the whole non-magnetic inorganic powders in the non-magnetic layer.

The magnetic layer comprises a ferromagnetic powder, carbon black and a lubricant dispersed in a binder.

The magnetic layer has a thickness in the range of 0.02 to 0.5 $\mu$m, preferably 0.03 to 0.45 $\mu$m. The thickness of the magnetic layer preferably does not vary or varies within 20% of the thickness of the magnetic layer.

Examples of the ferromagnetic powders include $\gamma$-$Fe_2O_3$, $Fe_2O_4$, $FeO_x$ (x=1.33–1.5), $CrO_2$, Co-containing $\gamma$-$Fe_2O_3$, Co-containing $FeO_x$ (x=1.33–1.5), ferromagnetic metal powders and hexagonal ferrite plate powders. In the invention, ferromagnetic metal powders and hexagonal ferrite plate powders are preferably employed.

The magnetic metal powder preferably has a specific surface area (BET) in the range of 30 to 70 $m^2$/g, and a crystallite size of 50 to 300 Å (determined by X-ray diffraction). If the specific surface area is too small, the desired high recording density cannot be attained. If the specific surface area is too large, satisfactory dispersion cannot be performed, and no smooth surface is produced on the magnetic layer. This also means that high recording density is not attained.

The ferromagnetic metal powder employed in the invention should contain Fe. For instance, they should be powders of iron per se or iron alloys such as Fe, Fe—Co, Fe—Ni, and Fe—Ni—Co. These ferromagnetic metal alloy powders preferably have saturation magnetization of not less than 110 emu/g, more preferably not less than 120 emu/g for enabling the desired high density recording. The coercive force preferably is not less than 800 Oe (Oersted), more preferably not less than 900 Oe. The longitudinal length of the powder (that is, a mean particle size) determined by electromicroscope of transmission type is preferably not more than 0.5 $\mu$m, preferably 0.1 to 0.35 $\mu$m, and the ratio of length in the longitudinal direction/length in the direction vertical to the longitudinal direction (i.e., shorter direction) preferably is in the range of 5 to 20, more preferably 5 to 15.

The ferromagnetic metal powder may contain Al and/or non-metals such as B, C, Si and P for improving its performance. The surface of the ferromagnetic metal powder generally has an oxidized layer for chemically stabilizing the electromagnetic property of the powder.

The hexagonal plate ferrite powder preferably has a specific surface area (BET) in the range of 25 to 65 $m^2$/g.

The plate ratio (aspect ratio: diameter/thickness of the plate) preferably is in the range of 2 to 15, and the length of the plate preferably is in the range of 0.02 to 1.0 $\mu$m. The hexagonal plate ferrite powder (i.e., plate-like powder) should have such sizes for enabling the desired high recording density, for the same reasons as described for the ferromagnetic metal powder.

The hexagonal plate ferrite powder employable in the invention has a shape of plate and is of ferromagnetic body having an axis of easy magnetization which is observed in the direction vertical to the plane of the ferrite plate. Examples of the hexagonal plate ferrite powders include barium ferrite, strontium ferrite, lead ferrite, calcium ferrite and their derivatives containing cobalt. A cobalt-containing barium ferrite and a cobalt-containing strontium ferrite area particularly preferred. The hexagonal plate ferrite powder employable in the invention, if desired, may contain other atoms such as In, Zn, Ge, Nb, V to improve its properties.

The hexagonal plate ferrite powder preferably has a saturation magnetization of not less than 50 emu/g, more preferably not less than 53 emu/g, and a coercive force of not less than 500 Oe, preferably 600 Oe, for the desired high density recording.

The above-described ferromagnetic powders preferably contain 0.01 to 2 weight % of water. The water content can be adjusted in consideration of the properties of the binder resin to be employed in combination. The pH of the ferromagnetic powder is also adjusted to an appropriate level in consideration of the property of the binder resin to be employed in combination. Generally, the appropriate range is from 4 to 12, preferably from 5 to 10. As described above, the ferromagnetic powder can be treated with Al, Si, P and/or their oxides on its surface, if desired. The amounts of these element for the surface treatment are generally in the range of 0.1 to 10 weight %. Such surface treatment serves to reduce adsorption of the lubricant by the surface of the ferromagnetic powder to a level of 100 mg/$m^2$ or less. Sometimes, the ferromagnetic powder may contain soluble inorganic ions such as ions of Na, Ca, Fe, Ni and Sr. However, such impurity does not adversely affect the properties of the ferromagnetic powder, so long as the content is 5,000 ppm or less.

The lubricant for the magnetic layer can be the same as the conventional one which is described for the material of the non-magnetic layer. The amount of the lubricant which can be incorporated into the magnetic layer generally is in the range of 0.2 to 20 weight parts based on 100 weight parts of the ferromagnetic powder in the magnetic layer.

The carbon black can be the same as that described for the material of the non-magnetic layer. However, the carbon black to be incorporated into the magnetic layer preferably has a mean particle size in the range of 5 to 350 m$\mu$, more preferably 10 to 300 m$\mu$. The carbon black can be a mixture of two or more kinds having different mean particle sizes. The amount of carbon black which can be incorporated into the magnetic layer generally is in the range of 1 to 30 weight parts, preferably 1 to 15 weight pars, based on 100 weight parts of the ferromagnetic powder in the magnetic layer.

The binder polymer contains no chlorine atom in its molecular structure and can be the same as that described for the material of the non-magnetic layer.

The magnetic layer can further contain auxiliary agents such as an abrasive and a dispersant.

Examples of the abrasives include melted alumina, silicon carbide, chromium oxide ($Cr_2O_3$), corundum, artificial corundum, diamond, artificial diamond, garnet, and emery (main ingredients: corundum and magnetite). These abrasives have a Mohs hardness of not lower than 5, preferably not lower than 6. The abrasive preferably has a mean particle size in the range of 0.05 to 1 $\mu$m, more preferably 0.2 to 0.8 $\mu$m. The abrasive is preferably incorporated into the magnetic layer in an amount of 3 to 25 weight parts, specifically 3 to 20 weight parts, per 100 weight parts of the ferromagnetic powder.

Examples of the dispersants (dye-wetting agents) include fatty acids having 12 to 22 carbon atoms ($R^1$COOH, wherein $R^1$ represents alkyl or alkenyl of 11 to 21 carbon atoms) such as caprylic acid, capric acid, lauric acid, myristic acid, palmitic acid, stearic acid, behenic acid, oleic acid, elaidic acid, linoleic acid, linolenic acid, and stearol acid; salts of alkali metals (e.g., Li, Na, and K) and alkaline earth metals (e.g., Mg, Ca, and Ba) and these fatty acids, that is, metal soaps; fatty acids (those as above) having fluorine atom; amides of fatty acids (those as above); polyalkylene oxide alkylphosphonate; lecithin; and trialkylpolyolefine oxyquaternary-ammonium salt (alkyl has 1 to 5 carbon atoms; olefin can be ethylene or propylene). The dispersant can be incorporated into the layer in the range of 0.5 to 20 weight parts per 100 weight parts of the binder polymer.

The representative processes advantageously employed for preparing the magnetic recording disk of the invention are described below in detail.

The process for the preparation of the magnetic recording disk of the invention generally comprises a coating stage, a slitting state, a punching stage, and a stage for encasing the punched disk into as cartridge. The coating stage preferably comprises the aforementioned step for forming the non-magnetic layer and magnetic layer by the wet-on-wet coating process, a step for random orientation of the magnetic powder in the magnetic layer while the coated non-magnetic and magnetic layers are still wet, a step for drying the non-magnetic layer and the magnetic layer, and a calendaring step for smoothing the surface of the magnetic layer. These steps are further described below in more detail.

Each of the coating solutions (i.e., coating liquids or mixtures) for forming the non-magnetic layer and the magnetic layer can be prepared by kneading and dispersing the appropriate ingredients and the binder in an organic solvent. The coating solution can be produced by a process comprising a kneading step and a dispersing step. A step for mixing the appropriate ingredients can be placed before, after and between these steps. Each step can comprise two or more separate steps. Each of these ingredients can be introduced in or before an optionally chosen step. One ingredient can be divided and incorporated into the solution separately. For instance, the whole amount of the binder such as polyurethane can be divided into plural portions, and each portion can be incorporated into the mixture solution during or after optionally chosen steps such as during the kneading step, during the dispersing step, and after the dispersing step, whereby adjusting the viscosity of the coating solution at each step.

Examples of the solvents employed for the preparation of the coating solutions include ketones such as acetone, methyl ethyl ketone, methyl isobutyl ketone, diisobutyl ketone, cyclohexanone, and isophorone; alcohols such as methanol, ethanol, propanol, butanol, isobutyl alcohol, isopropyl alcohol, and methylcylohexanol; esters such as methyl acetate, ethyl acetate, butyl acetate, isobutyl acetate, isopropyl acetate, ethyl lactate and glycol acetate; ethers such as diethyl ether and tetrahydrofuran; glycol ethers such as glycol dimethyl ether, glycol monoethyl ether and dioxide; aromatic hydrocarbons such as benzene, toluene, xylene, cresol and chlorobenzene; chlorinated hydrocarbons such as methylene chloride, ethylene chloride, carbon tetrachloride, chloroform, ethylene chlorohydrin and dichlorobenzene; N,N-dimethylformamide; and hexane. Any of these organic solvents are not necessary of 100% pure, and can contain a small amount of impurities such as isomers, unreacted compounds, by-products, decomposed compounds, and oxidized compounds. The contents of such impurities are preferred to be 30% or less, more preferably 10% or less.

The solvent and its amount can be varied between the coating solution for the formation of the magnetic layer and the coating solution for the formation of the non-magnetic layer. For instance, a highly volatile solvent can be employed for the coating solution for the magnetic layer to improve its surface smoothness. A solvent having a high surface tension such as cyclohexanone or dioxane can be employed for increasing stability of the coated magnetic layer. A solvent having a high solubilizing parameter can be used for increasing the packing density of the non-magnetic layer.

Before the forming the non-magnetic layer, a subbing layer (i.e., undercoating) can be placed on the support. The thickness of the subbing layer preferably is in the range of 0.01 to 2 $\mu$m, more preferably 0.05 to 0.5 $\mu$m. If the combination of the non-magnetic layer and magnetic layer is provided only on one surface of the non-magnetic support, other surface can be provided with a back-coat layer. The thickness of the back-coat layer preferably is n the range of 0.1 to 2 $\mu$m, more preferably 0.3 to 1.0 $\mu$m. The subbing layer and the back-coat layer can be formed on the support in any of the manners known for the preparation of magnetic recording tapes and magnetic recording disks.

The non-magnetic layer and the magnetic layer are then formed by any of the aforementioned wet-on-wet coating processes.

Subsequently, the magnetic layer is subjected to random orientation, while it is still wet, that is, under wet condition. The random orientation can be performed by the use of a permanent magneto (Japanese Patent Publication H3-41895), or by application of AC magnetic field (Japanese Patent Provision Publications No, 62-92132, No. 62-148417, No. H1-300427, and No. H1-300428). The latter procedure is preferably employed in the invention. In more detail, the composite of the wet non-magnetic layer and the wet magnetic layer is passed through a pair of two alternating current magnetic fields. The frequency and the magnetic field strength of each A.C. magnetic field is generally 50 Hz, 50 to 500 Oe, and 120 Hz, 50 to 500 Oe. Preferably, the orientation ratio should be adjusted to 0.85 or more by the random orientation processing of the ferromagnetic powder. Under such conditions, a reproduction output can be made to the same level at any radial directions of the disk.

The non-magnetic layer ad magnetic layer on the support having been subjected to the random orientation procedure are dried and then subjected to the calendaring processing.

The calendaring is performed by the composite of the support, the non-magnetic layer and the magnetic layer having been dried through a set of heated rollers. The rollers are preferably plastic rollers made of heat resistant plastic material such as epoxy resin, polyimide resin, polyamide resin, or polyamidoimide resin. A metallic rollers can be used. Preferred calendaring conditions are as follows: heating temperature in the range of 70° to 120° C., preferably 80° to 110° C., and a linear pressure in the range of 200 to 450 kg/cm, preferably 250 to 400 kg/cm. The calendaring machine is preferably provided with 5 to 11 sets of rollers which can be operated at a rate of 50 to 500 m/min.

The calendared body is then slitted and punched to give a magnetic recording disk. The produced disk is then encased in an appropriate cartridge.

The magnetic recording disk of the invention preferably has a surface resistivity on its magnetic layer in the range of $1 \times 10^5$ to $5 \times 10^9$ ohm/sq. The breaking strength of the magnetic layer preferably is in the range of 1 to 30 kg/cm$^2$. The heat shrinkage at 100° C. preferably is 1% or less, more preferably 0.5% or less, most preferably 0.1% or less. The amount of the solvent remaining in the magnetic layer preferably is not more than 100 mg/m$^2$, more preferably not more than 10 mg/m$^2$. It is preferred that the amount of the solvent remaining in the magnetic layer is less than the amount of the solvent remaining in the non-magnetic layer.

The magnetic recording layer of the invention can be adjusted in its physical properties with respect to both the magnetic layer and the non-magnetic layer, if desired. For instance, the modulus of elasticity of the magnetic layer can be increased to improve the running endurance. If the modulus of elasticity of the non-magnetic layer is adjusted to become less than the modulus of elasticity of the magnetic layer, the contact to a magnetic head of the magnetic recording disk of the invention can be improved.

The magnetic recording and reproducing method of the invention can be performed using the above-mentioned magnetic recording disk of the invention. When the magnetic recording disk of the invention is employed, a digital signal having a minimum recording wavelength (i.e., a shortest recording wavelength recorded on the inner periphery of the magnetic recording disk in the case of recording at a constant rate) of 1.5 µm or less can be recorded and reproduced. Further, since the thickness of the magnetic layer of the magnetic recording disk of the invention is so thin as to be 0.5 µm or less, the overwriting property which should be noted in the digital recording is improved.

The method of recording and reproducing digital signal on the magnetic recording disk of the invention can be made under the condition that the disk is kept to be in contact with a magnetic head or not. In the latter case, the magnetic recording disk is kept apart from the magnetic head.

The recording and reproducing under the condition that the recording disk is kept in contact with a magnetic head can be performed according to the cymbal system which is adopted in the commercially available floppy disk drives for floppy disks of 3.5 inches, 5 inches, 8.5 inches, etc. In this system, the magnetic head is placed on the disk under a certain pressure or the disk is sandwiched between magnetic heads. The rotation rate of the disk generally is in the range of 200 to 2,000 r.p.m. If the rotation rate is too high, an air is introduced between the head and the disk, which disturbs reliable contact of the disk to the head.

The recording and reproducing under the condition that the recording disk is kept not in contact with the magnetic head can be performed in such commercially available disk drives using such head mechanism as of Winchester system or according to Verneuil Effect. The disk is preferably rotated at a high speed such as at a rotation rate of 2,000 to 15,000 r.p.m., so as to ensure stable non-contact conditions and increase the data transfer rate.

The invention is further described by the following examples, in which "part(s)" means "part(s) by weight", unless otherwise specified.

EXAMPLE 1

Preparation of Coating Solutions for Forming Non-Magnetic Layer and Magnetic Layer

| | part(s) |
|---|---|
| (1) Non-magnetic layer | |
| Titanium dioxide (TiO$_2$, non-magnetic inorganic powder, TTO-55B, tradename of product available from Ishihara Sangyo Co., Ltd., mean particle size: 0.04 µm, BET specific surface area: 40 m$^2$/g, pH 7.0, Mohs hardness: 6.0) | 75 |
| Carbon black (Ketchen Black EC, tradename, product available from Lion-Akzo Co., Ltd., mean particle size: 30 mµ, DBP oil absorption: 350 mL/100 g, pH 9.5, BET specific surface area: 950 m$^2$/g, volatile amount: 1.0%) | 10 |
| α-Alumina (Al$_2$O$_3$, non-magnetic inorganic powder, AKP-15, tradename, product available from Sumitato Chemical Industries Co., Ltd., mean particle size: 0.65 µm, Mohs hardness: 9.0) | 15 |
| Polyester polyurethane resin containing polar group (—SO$_3$Na) (Mw: 50,000, Tg: 20° C.) | 17 |
| Isohexyldecyl stearate | 4 |
| n-Butyl stearate | 4 |
| Butoxyethyl stearate | 4 |
| Oleic acid | 1 |
| Stearic acid | 1 |
| Methyl ethyl ketone | 300 |
| (2) Magnetic layer | |
| Ferromagnetic metal powder (Fe:Ni = 96:4, coercive force (Hc): 1600 Oe, BET specific surface area: 45 m$^2$/g, crystallite size: 220 Å, saturation magnetization (σS): 135 emu/g, particle size (mean longitudinal size): 0.20 µm, aspect ratio: 9) | 100 |
| Polyester polyurethane resin containing polar group (—SO$_3$Na) (Mw: 50,000 Tg: 20° C.) | 17 |
| α-Alumina (particle size: 0.65 µm) | 2 |
| Chromium oxide (particle size: 0.35 µm) | 15 |
| Carbon black (particle size: 0.03 µm) | 2 |
| Carbon black (particle size: 0.3 µm) | 9 |
| Isohexyldecyl stearate | 4 |
| n-Butyl stearate | 4 |
| Butoxyethyl stearate | 4 |
| Oleic acid | 1 |
| Stearic acid | 1 |
| Methyl ethyl ketone | 300 |

(3) Preparation of the Coating Solutions

The ingredients of the non-magnetic layer and the magnetic layer were separately kneaded in a continuous kneader and dispersed in a sand mill. The polymethylenepolyphenylene polyisocyanate of the aforementioned formula (II) (Millionate MR400, tradename, product available from Nihon Polyurethanes Industry Co., Ltd.) was added to the resulting dispersion (10 parts for the non-magnetic layer coating solution, and 10 parts for the magnetic layer coating solution). Subsequently, 40 parts of butyl acetate were added to both solutions. Both solutions were filtered over a filter having a mean pore size of 1 µm to give a coating solution for non-magnetic layer and a coating solution for magnetic layer.

Preparation of Magnetic Recording Disk

The resulting coating solutions for non-magnetic layer and magnetic layer were coated on both surface of a polyethylene phthalate support (thickness: 62 µm, center line surface roughness: 0.01 µm) by the simultaneous double coating method under the conditions that the thickness after dryness of the non-magnetic layer should become 1.5 μm, and the thickness after dryness of the magnetic layer on the non-magnetic layer should become 0.45 μm. Then, while both coated layers were still wet, they were passed through a pair of A.C. magnetic field generators (frequency 50 Hz, magnetic field strength 250; and frequency 50 Hz, magnetic field strength 120) for attaining random orientation.

They were then dried and calculated in a calendar machine having seven sets of rollers (temperature 90° C., linear pressure 300 kg/cm). The calendared product was punched to give a disk having a diameter of 3.5 inches. The disk was polished on its surfaces and encased into a cartridge of 3.5 inches having inside liners, and the cartridge was equipped with necessary mechanical parts.

EXAMPLE 2

The procedures of Example 1 were repeated except that the polymethylenepolyphenylene polyisocyanate used for the formation of the non-magnetic and magnetic layers was replaced with the polyisocyanate of the aforementioned (I) (Barnock D802F, Dainippon Ink and Chemicals Industries Co., Ltd.), to give a magnetic recording disk, which was then encased in the cartridge.

EXAMPLE 3

The procedures of Example 1 were repaired except that the polyester polyurethane resin used for the formation of the non-magnetic and magnetic layers was replaced with a polyester polyurethane resin having —$SO_3Na$ polar group (Mw: 50,000, Tg: 38° C.), to give a magnetic recording disk, which was then encased in the cartridge.

EXAMPLE 4

The procedures of Example 1 were repeated except that the magnetic layer was formed to give a thickness after dryness of 0.11 μm, to give a magnetic recording disk, which was then encased in the cartridge.

EXAMPLE 5

The procedures of Example 1 were repeated except that the α-alumina used for the formation of the non-magnetic was replaced with an α-alumina having a mean particle size of 0.23 μm and a Mohr's hardness of 9.0 (HIT-55, product of Sumitomo Chemical Industries Co., Ltd.), to give a magnetic recording disk, which was then encased in the cartridge.

Comparison Example 1

The procedures of Example 1 were repeated except that 17 parts of the polyester polyurethane resin used for the formatoin of the non-magnetic and magnetic layers was replaced with a combination of 12 parts of a vinyl chloride copolymer having —$SO_3Na$ polar group (MR-110, product of Nihon Geon Co., Ltd.) and 5 parts of a polyester polyurethane resin having —$SO_3Na$ polar group (Mw: 50,000, Tg: 20° C.), to give a magnetic recording disk, which was then encased in the cartridge.

Comparison Example 2

The procedures of Example 1 were repeated except that the polymethylenepolyphenylene polyisocyanate used for the formation of the non-magnetic and magnetic layers was replaced with polyisocyanate (Colonate, Nippon Polyurethane Co., Ltd.), to give a magnetic recording disk, which was then encased in the cartridge.

Comparison Example 3

The procedures of Example 1 were repeated except that no carbon black was employed for the formation of the magnetic layer, to give a magnetic recording disk, which was then encased in the cartridge.

Comparison Example 4

The procedures of Example 1 were repeated except that the magnetic layer was formed to give a thickness after dryness of 0.65 μm, to give a magnetic recording disk, which was then encased in the cartridge.

Evaluation of Magnetic Recording Disk

Various characteristics of the obtained magnetic recording disk were evaluated in the following manner.

(1) Knoop Hardness

Apparatus for measurement:
Ultra-light weight hardness tester (DMH-2LS, product of Matsuzawa Seiki Co., Ltd.)

The Knoop hardness was measured using a diamond penetrator of a quadrangular pyramid type having a rhombic cross section (opposite angles: 172.5°, 130°). The penetrator was pressed onto the magnetic layer of the disk. The projected area of the formed depression (measured from the length of longer diagonal of the depression) was measured. Also measured was the weight required for the formation of the depression. The measured values were calculated according to the following equation:

$$\text{Knoop hardness (Hk)} = F/A = F/Cd^2 = 14.23 \, F/d^2$$

F: Weight (kgf)
A: Projected area of depression ($mm^2$)
C: Penetrator constant 0.07028
d: Length of longer diagonal of depression (mm)

Measuring Method

The disk specimen was placed on a glass plate which was then fixed on a horizontally set sample table at 25° C., 50%RH. The penetrator was pressed onto the specimen at 1 gf for 15 seconds to form a depression. The size of the formed depression was measured using the attached microscope (×1,000).

(2) Corrosion test using permalloy thin film

The permalloy material which was to be used for a magnetic head was spattered onto a flexible substrate to form a permalloy film. The permalloy film was cut to give a specimen (10 cm×10 cm). The specimen was wound and fixed around a glass tube (diameter: 30 mm, length: 100 mm). Around the fixed permalloy fixed was wound the disk specimen under tension of 50 g/$cm^2$ so that the magnetic layer of the disk specimen was brought into close contact with the surface of the permalloy film. Thus obtained sample was placed for 30 days at 60° C., 90%RH. Thereafter, the disk specimen was separated from the permalloy film, and the surfaces of both specimens were observed by an optical micrometer. The evaluation was made according to the following criteria:

A: No change was observed on both the surfaces of the permalloy film and magnetic layer.
B: Corrosion was observed on a portion of one of the surfaces of the permalloy film and magnetic layer.
C: Corrosion was observed widely on both the surfaces of the permalloy film and magnetic layer.

(3) Liner wear

The drop-out (in terms of missing pulse) was measured on each of the magnetic disks in which signals at recording frequency of 625 kHz were recorded over the whole surface (total 255 tracks). The measurement was performed using a commercially available floppy disk drive (FD1335 type, product of Nippon Electric Company, Ltd.).

The same magnetic disk was rotated in another floppy disk drive (FD1335 type) having no head under the conditions of the below-mentioned thermo cycle. The rotation was made 20,000,000 cycles (pass). Thereafter, the same signals were recorded on thus treated magnetic disk in the manner as above to measure the drop-out after the rotation under the thermo cycle conditions.

Thermo-cycle flow:
1): 25° C. 50%RH, 1 hr.→heating, 2 hr.→
2): 60° C., 20%RH, 7 hrs.→cooling, 2 hrs.→
3): 25° C., 50%RH, 1 hr.→cooling, 2 hrs.→
4): 5° C., 10%RH, 7 hrs.→heating, 2 hrs.→1)

The drop-out was measured using a commercially available HFQ-35 (product of Expert Magnetics Co., Ltd.). The drop-out measured was a value defined by 8.8.1 missing pulse for 8.8 track quality (JIS 90 mm flexible disk cartridge X6227).

Thus treated magnetic disk was compared on its surface conditons between the conditions before and after the thermo-cycle rotation. The drop-out areas formed after the thermo-cycle rotation were detected and observed in detail using a microscope. The drop-out areas were checked for determining the drop-out area formed by the released liner fibers or the drop-out area formed by the dropped magnetic layer material. The evaluation was made by the following criteria:

A: Almost no drop-out areas were observed, namely, no liner fiber drop-out and no magnetic layer drop-out; liner wear at a satisfactory level.

B: Some drop-out areas were observed, namely, some liner fiber drop-out and some magnetic layer drop-out; liner wear almost at an unacceptable level.

C: Great drop-out areas were observed, namely, great liner fiber drop-out and great magnetic layer drop-put; liner wear at an acceptable level.

(4) Surface Resistivity (Ω/sq)

The surface resistivity was measured in accordance with the method defined in JIS-X-6101.9.4 using a digital super insulating resistance meter (TR-8611A, tradename, product of Takeda Riken Co., Ltd.).

(5) Measurement of Reproduction Output

The signal of recording frequency of 625 kHz was recorded on the magnetic recording disk by means of a disk tester (SK-606B, tradename, product of Tokyo Engineering Co., Ltd.) which had a metal in-gap head having a gap length 0.45 $\mu$m, at the position of 24.6 mm (radius). The reproduction output at the head multiplier was measured by means of a cathode-ray oscilloscope (7633 type, available from Tectronics Co., Ltd.). The reproduction output was obtained in terms of a relative value (to 100 for the reproduction output of the magnetic recording disk of Example 1).

(6) Overwriting Property

The signal of 312.5 kHz was recorded in the magnetic recording disk after A.C. erasure, using the above testing device at the position of 39.5 mm (radius), and the output 01 (dB) at the 312.5 KHz portion was measured by means of a spectrum analyzer (TR4171, tradename, product of Advantest Co., Ltd.). Immediately after, the signal of 1 MHz was overwritten, and the output 02 (dB) at the 312.5 KHz portion was measured. The overwriting property is expressed in terms of a value of 02–01 (dB). The magnetic recording disk preferably has an overwriting property value of −30 dB or less.

(7) Running Endurance (or Durability)

A signal was recorded on the whole 240 tracks at the recording frequency of 625 kHz using a floppy disk drive (FD1331, tradename, product of Nihon Electric Co., Ltd.). Thereafter, a thermo-cycle test at the position of 37.25 mm from the center in the radial direction in which one cycle comprised the flow described below.

Every 24 hours, the dropout on every track was counted, and failure was marked when the remaining output reached 45% or less. The running endurance was evaluated at the time when the running was continued to reach pass times of 12,000,000 (555 hours) under the thermo-cycle conditions.

The test results are set forth in Table 1.

TABLE 1

| Example | Knoop hardness | Permalloy corro. | Liner wear | Running endurance (× 10$^4$ pass) | Surface resist. (Ω/sq) | Repro. output (%) | Overwrit. (dB) |
|---|---|---|---|---|---|---|---|
| Ex. 1 | 16 | A | A | 1200 OK | 5 × 10$^6$ | 100 | −33 |
| Ex. 2 | 16 | A | A | 1200 OK | 5 × 10$^6$ | 102 | −32 |
| Ex. 3 | 16 | A | A | 1200 OK | 8 × 10$^6$ | 100 | −32 |
| Ex. 4 | 17 | A | A | 1200 OK | 5 × 10$^6$ | 96 | −42 |
| Ex. 5 | 17 | A | A | 1200 OK | 5 × 10$^6$ | 102 | −33 |
| Com. 1 | 18 | C | A | 1200 OK | 4 × 10$^6$ | 100 | −33 |
| Com. 2 | 13 | A | B | 1000 out | 5 × 10$^6$ | 103 | −34 |
| Com. 3 | 17 | A | C | 50 out | 8 × 10$^{12}$ | 104 | −35 |
| Com. 4 | 16 | A | A | 1200 OK | 5 × 10$^6$ | 110 | −22 |

The results in Table 1 show that the magnetic recording disks according to the invention (Examples 1 to 5) have satisfactory performance in the electromagnetic conversion characteristics (such as reproduction output and overwriting property), the surface resistivity, the running endurance, the corrosion of magnetic head, and the liner wear.

In contrast, a magnetic recording disk using a chlorine-containing binder polymer causes corrosion on the magnetic layer as well as the permalloy film (Comparison Example 1); a magnetic recording disk having low Knoop hardness is poor in the running endurance and causes severe liner wear (Comparison Example 2); a magnetic recording disk containing no carbon black in its magnetic layer is poor in the running endurance, causes more severe liner wear, and the surface resistivity increases (Comparison Example 3); and a magnetic recording disk having a thick magnetic layer of thicker than 0.5 $\mu$m gives poor overwriting property (Comparison Example 4).

What is claimed is:

1. A magnetic recording disk comprising a flexible non-magnetic support, a non-magnetic layer of 0.5 to 5 $\mu$m thick which is arranged on the support and comprises a non-magnetic inorganic powder in a binder, and a magnetic layer of 0.02 to 0.5 $\mu$m thick which is arranged on the non-magnetic layer and comprises a ferromagnetic powder, carbon black and a lubricant dispersed in a binder, wherein the binders of the non-magnetic layer and the magnetic layer both comprise a polymer containing no chlorine atom in its molecular structure and the magnetic layer has an upper surface having a Knoop hardness of 14 to 25.

2. The magnetic recording disk of claim 1, wherein the non-magnetic inorganic powder in the non-magnetic layer comprises at least two kinds of non-magnetic inorganic powders having different mean particle sizes, one of which has a mean particle size in the range of 10 to 80% of the thickness of the non-magnetic layer and another of which has a mean particle size in the range of 0.5 to 10% of the thickness of the non-magnetic layer, the former powder and the latter powder being in a weight ratio of 3:97 to 40:60.

3. The magnetic recording disk of claim 2, wherein the mean particle size of one non-magnetic inorganic powder in the non-magnetic layer differs from the mean particle size of another non-magnetic inorganic powder by at least 5% of the thickness of the non-magnetic layer.

4. The magnetic recording disk of claim 2, wherein the non-magnetic inorganic powders both have a Mohs hardness of not less than 5.

5. The magnetic recording disk of claim 2, wherein the non-magnetic inorganic powder having a mean particle size in the range of 10 to 80% of the thickness of the non-magnetic layer has a Mohs hardness higher than a Mohs hardness of the non-magnetic inorganic powder having a mean particle size in the range of 0.5 to 10% of the thickness of the non-magnetic layer.

6. The magnetic recording disk of claim 2, wherein the non-magnetic inorganic powder having a mean particle size in the range of 10 to 80% of the thickness of the non-magnetic layer has a first Mohs hardness and the non-magnetic inorganic powder having a mean particle size in the range of 0.5 to 10% of the thickness of the non-magnetic layer has a second Mohs hardness and wherein the first Mohs hardness is greater than the second Mohs hardness by at least 2.

7. The magnetic recording disk of claim 2, wherein the non-magnetic inorganic powder having a mean particle size in the range of 10 to 80% of the thickness of the non-magnetic layer is a powder of α-alumina.

8. The magnetic recording disk of claim 2, wherein the non-magnetic inorganic powder having a mean particle size in the range of 0.5 to 10% of the thickness of the non-magnetic layer is a powder of titanium dioxide.

9. The magnetic recording disk of claim 1, wherein the polymer containing no chlorine atom in its molecular atom is a polyurethane resin.

10. The magnetic recording disk of claim 1, wherein the polymer containing no chlorine atom in its molecular atom is a polyurethane resin having a polar group in its molecular structure in an amount of $10^{-1}$ to $10^{-8}$ mole/g.

11. The magnetic recording disk of claim 1, wherein the polymer containing no chlorine atom in its molecular atom is cured by a trimer of isocyanate or a polymethylenepolyphenylene polyisocyanate within the layered disk.

12. The magnetic recording disk of claim 1, wherein the carbon black in the magnetic layer has a mean particle size in the range of 10 to 35 mµ.

13. The magnetic recording disk of claim 1, wherein the non-magnetic layer further comprises carbon black in an amount of 3 to 20 weight parts based on 100 weight parts of the whole non-magnetic inorganic powders in the non-magnetic layer.

14. The magnetic recording disk of claim 1, wherein the non-magnetic layer has thickness in the range of 1.0 to 3.5 µm, and the magnetic layer has a thickness in the range of 0.03 to 0.45 µm.

15. The magnetic recording disk of claim 1, wherein the magnetic layer has been formed on the non-magnetic layer when the non-magnetic layer has had a wet surface.

16. A magnetic recording and reproducing method employing the magnetic recording disk of claim 1, which comprises recording a set of digital signals having a minimum recording wavelength of not longer than 1.5 µm on the magnetic layer of the magnetic recording disk under such condition that a magnetic head is kept in contact with the magnetic layer, and reproducing the recorded digital signals form the magnetic layer under such condition that a magnetic head is kept in contact with the magnetic layer.

* * * * *